(12) United States Patent
Cairns

(10) Patent No.: US 7,769,265 B2
(45) Date of Patent: Aug. 3, 2010

(54) APPARATUS AND METHOD FOR MANAGING FLEXIBLE ELONGATE ELEMENTS

(75) Inventor: James L. Cairns, Ormond Beach, FL (US)

(73) Assignee: Teledyne ODI, Inc., Daytona Beach, FL (US)

( * ) Notice: Subject to any disclaimer, the term of this patent is extended or adjusted under 35 U.S.C. 154(b) by 83 days.

(21) Appl. No.: 11/769,911

(22) Filed: Jun. 28, 2007

(65) Prior Publication Data

US 2009/0003791 A1    Jan. 1, 2009

(51) Int. Cl.
G02B 6/00    (2006.01)

(52) U.S. Cl. .................... 385/135; 385/134; 385/136; 385/137; 242/129.5; 242/134; 242/136; 242/174; 242/406; 242/590; 242/603

(58) Field of Classification Search .................... None
See application file for complete search history.

(56) References Cited

U.S. PATENT DOCUMENTS

| | | | |
|---|---|---|---|
| 1,559,133 A | 10/1925 | Tunis et al. | |
| 2,677,510 A | 5/1954 | Osborne | |
| 3,666,200 A * | 5/1972 | Newman et al. | 242/163 |
| 4,067,441 A * | 1/1978 | Newman et al. | 206/398 |
| 4,722,585 A * | 2/1988 | Boyer | 385/135 |
| 4,842,216 A | 6/1989 | Zajac | |
| 5,109,983 A | 5/1992 | Malone et al. | |
| 5,193,756 A | 3/1993 | Chesler | |
| 5,363,440 A | 11/1994 | Daoud | |
| 5,364,042 A | 11/1994 | Wyman | |
| 5,467,939 A | 11/1995 | Georges | |
| 5,468,252 A | 11/1995 | Kaplan et al. | |
| 5,547,147 A | 8/1996 | Georges | |
| 5,649,677 A | 7/1997 | Culp | |
| 5,703,991 A | 12/1997 | Izumi | |
| 5,781,686 A | 7/1998 | Robinson et al. | |
| 5,790,741 A | 8/1998 | Vincent et al. | |

(Continued)

FOREIGN PATENT DOCUMENTS

GB    2355313 A1    4/2001

OTHER PUBLICATIONS

U.S. Appl. No. 11/765,920, Cairns.

(Continued)

*Primary Examiner*—Uyen-Chau N Le
*Assistant Examiner*—Chad H Smith
(74) *Attorney, Agent, or Firm*—Procopio, Cory, Hargreaves & Savitch LLP

(57) ABSTRACT

An apparatus for managing lengths of flexible elongate elements between two fixed points has a single spool with a track of predetermined width sufficient for winding alternate turns of the elongate element about opposite side regions of the track in a folded figure eight pattern. A first turn of the elongate element is wound about a first side region of the track, then the element is crossed over to the second side region of the track and a second turn is wound about the second side region of the track. The elongate element is crossed back over to the first side region and a third turn is wound about the first side region. The process is repeated until at least the majority of the slack between the fixed points on the element has been taken up.

32 Claims, 6 Drawing Sheets

U.S. PATENT DOCUMENTS

| | | | |
|---|---|---|---|
| 5,979,812 A * | 11/1999 | Kotzur et al. | 242/163 |
| 6,095,461 A | 8/2000 | Daoud | |
| 6,290,156 B1 * | 9/2001 | Jeffrey | 242/171 |
| 6,422,504 B1 * | 7/2002 | Elder | 242/594.6 |
| 6,738,554 B2 | 5/2004 | Daoud et al. | |
| 6,833,744 B2 * | 12/2004 | Yi | 327/175 |
| 6,883,744 B2 * | 4/2005 | Couchey et al. | 242/475.7 |
| 7,065,282 B2 | 6/2006 | Sasaki et al. | |
| 7,072,560 B1 | 7/2006 | Bramson | |
| 7,116,885 B2 | 10/2006 | Brown et al. | |
| 7,330,627 B2 | 2/2008 | Mullaney et al. | |
| 2004/0258385 A1 | 12/2004 | Kadrnoska et al. | |
| 2006/0239628 A1 | 10/2006 | Weinert et al. | |
| 2007/0114319 A1 * | 5/2007 | Anderson et al. | 242/395 |
| 2008/0037945 A1 | 2/2008 | Gniadek et al. | |
| 2008/0296426 A1 | 12/2008 | Cairns et al. | |

OTHER PUBLICATIONS

U.S. Appl. No. 11/757,023, Cairns.

ISR and Written Opinion for PCT/US2008/065673 issued Feb. 13, 2009.

* cited by examiner

APPARATUS AND METHOD FOR MANAGING FLEXIBLE ELONGATE ELEMENTS

BACKGROUND

1. Field of the Invention

The present invention relates to an apparatus and method for managing flexible lines or flexible elongate elements such as a wire, tube, individual fiber, ribbon fiber, or cable with fixed ends.

2. Related Art

When terminating optical connectors or other devices to optical fiber cables, it is necessary to splice the optical fibers together. Since excess fiber length is needed to perform fusion splicing, an excess of fiber is left between the devices after splicing. The excess fiber length has to be managed. Since both ends of the fiber are fixed or inaccessible, coiling the fiber is difficult and potentially damaging due to the torque which builds up with each loop. Fiber is also susceptible to optical measurement losses or shortened life if it is wound to a radius smaller than the minimum fiber bend radius. It is known to wind fiber in a figure eight pattern, relieving the torque as you wind first in one direction then in the other. One known fiber management system is two spaced, coplanar spools between the fixed fiber ends. Fiber is wound in a figure eight pattern on the spools, while maintaining a radius greater than the minimum fiber bend radius. The two side-by-side spools take up additional space between the optical devices.

Similar problems are encountered in managing lengths of other lines such as flexible wires or tubes with fixed ends. Simply coiling such lines can also be difficult due to torque build up.

Therefore, what is needed is an apparatus and method that reduces or overcomes these significant problems found in the known systems as described above.

SUMMARY

Embodiments described herein provide for an apparatus and method for managing flexible lines or flexible elongate elements between fixed ends or points in the line to handle any slack in the line between the fixed ends.

According to one aspect, an apparatus for managing flexible lines is provided, which comprises a spool having an outwardly directed winding track or race of predetermined width, first and second side regions extending around opposite sides of the track and a central region between the side regions, the first and second side regions receiving alternating, successive windings of a flexible line with the flexible line crossing over from one side region to the other side region between successive windings at the central region of the track, such that a folded figure eight pattern is formed.

In one embodiment, at least one guide member projects radially outwards from the central region of the track as a guide for windings about the opposite side regions. In other embodiments, no guide member is used. Where the spool is used for managing ribbon fiber or other strip-like material, the track width is at least equal to two times the width of the ribbon fiber plus the width of the guide member, so that alternate turns of the ribbon fiber can be wound around the two side regions of the winding track on opposite sides of the guide member.

In one embodiment, the spool has a pair of spaced rims extending around opposite sides of the winding track or race in order to help hold windings of a flexible line or flexible elongate element on the track. The guide member may be fixed or removably mounted on the track, and acts as a guide as a flexible elongate element is wound around the track first in a path around one side of the guide member and then in a path around the other side of the guide member.

In one embodiment, the guide member is a stand-off clip which may be integrally formed on the track or may be removably mounted in a slot provided at the center of the track. The apparatus may further comprise a mounting device for holding the spool. The mounting device may be a base having at least one mounting recess or slot, and the outer end of the stand-off clip may be adapted for releasable engagement in the mounting recess or slot. The stand-off clip in this case mounts the spool on the base, and also acts as both a guide for alternate side windings of the flexible elongate element and as a stand-off which spaces the spool above the base to provide space for winding purposes. In another embodiment, the spool may have a central axial opening and the mounting device may be a mounting base and a hub extending from one face of the base which extends through the opening in the spool. In this embodiment, the guide member may be an integral projection or bump formed at the center of the track, or may be a separate guide member removably mounted in the track.

The apparatus may be used to manage any type of flexible elongate line or element, such as optical fibers, electrical wires, cables, ropes, flexible tubes or hoses, threads, or the like, with suitable adjustment of the winding track width and diameter on each spool. The material of the spool may also be varied, depending on the material of elongate line to be managed.

According to another aspect, a method of managing a length of a flexible, elongate element extending between two fixed ends is provided, which comprises positioning a spool between the fixed ends of the elongate element, the spool having an outwardly facing winding track for receiving alternate windings of the elongate element on first and second side regions of the track, winding a first turn of the elongate element around the first side region of the track, crossing the elongate element over to the second side region of the track in a cross over area and winding a second turn of the elongate element around the second side region of the track, crossing the elongate element back over to the first side region of the track at the cross over area, and repeating the preceding four steps until at least the majority of the slack in the length of the elongate element between the fixed ends is taken up.

In one embodiment, a method of splicing fibers or the like to extend between two fiber optic devices and managing excess length of fiber between the devices after splicing is provided, which comprises adjusting the lengths of the fiber pigtails extending from each device such that the total pigtail length is a selected length based on the distance between each device and a spool race or track around which the spliced fiber is to be wound, and n times the spool track circumference, where n is an integer, splicing the fiber pigtails together, winding the length of spliced fiber in a first turn about a first side region of the track, crossing the fiber over to the second side region of the track, winding a second turn about the second side region of the track, crossing the fiber back to the first side region of the track, and repeating the preceding four steps until at least the majority of the slack in the spliced fiber between the devices is taken up.

With this method, the spliced fiber is wound in a generally folded figure eight pattern, but about a single winding spool. This technique results in cancellation of twists in the fiber which would otherwise occur if a fiber was wound straight around the spool with each turn lying directly over the preceding turn. If the fiber is a ribbon fiber, this winding method helps to keep the ribbon fiber substantially flat on the spool and reduces torque as a result of twist in the ribbon fiber.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
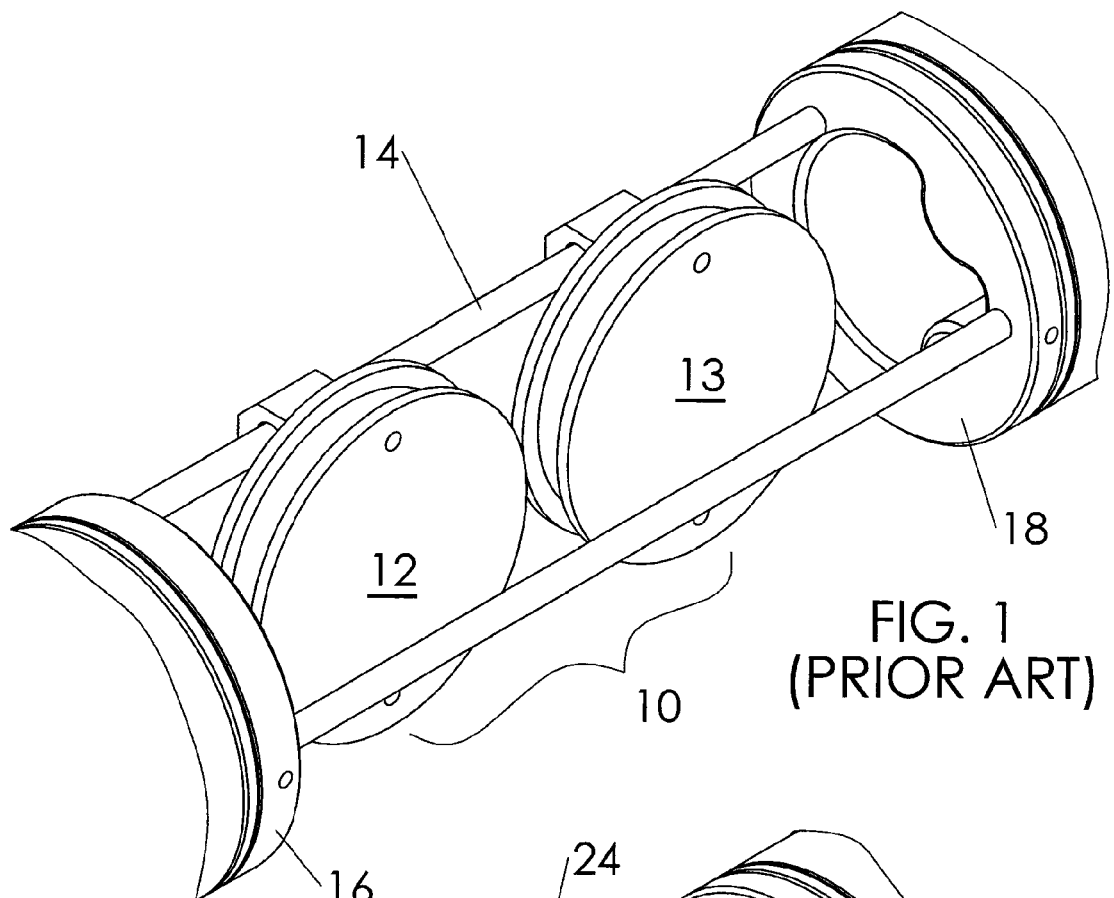
FIG. 1 is a perspective view of a prior art fiber management apparatus positioned between two fiber optic devices.

Certain embodiments as disclosed herein provide for an apparatus and method for managing flexible lines or flexible elongate elements having fixed ends. For example, one apparatus and method as disclosed herein allows for managing excess of fiber between fixed ends or points on the fiber produced when terminating various devices to optical fiber cables.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the following description, embodiments of an apparatus and method for managing fibers such as optical fibers are described, but the described apparatus and methods may alternatively be used for managing other types of flexible line or flexible elongate elements, such as electrical or other flexible wires, cables, ropes, flexible tubes or hoses, threads, or the like. In the case of optical fiber, the fiber may be one or more individual optical fibers or a ribbonized fiber (ribbon fiber). Ribbon fiber contains multiple fibers in a ribbon-like form. The management apparatus and methods for flexible elongate elements or lines other than fibers may be identical to those described in the embodiments below, with appropriate adjustment of the scale and material of the apparatus to accommodate flexible elongate elements of different sizes and materials.

The term "spool" as used in this application means a device on which a flexible elongate element can be wound or spooled. Although the spools illustrated in the drawings and described below are round, in other embodiments the spools may have other continuous loop shapes such as elliptical, oval, polygonal, or the like.

FIG. 1 illustrates a prior art fiber management apparatus 10 comprising two spools 12,13 positioned in a side-by-side, coplanar arrangement and secured to a stand-off rod 14 between two fiber optic devices 16,18 such as a connector shell and a cable termination housing. Excess of fiber, after the fiber pigtails from each device have been spliced, is managed by winding in a figure eight pattern around the two spools 12, 13. It can be seen that this arrangement takes up a significant amount of space.

Figure 2:
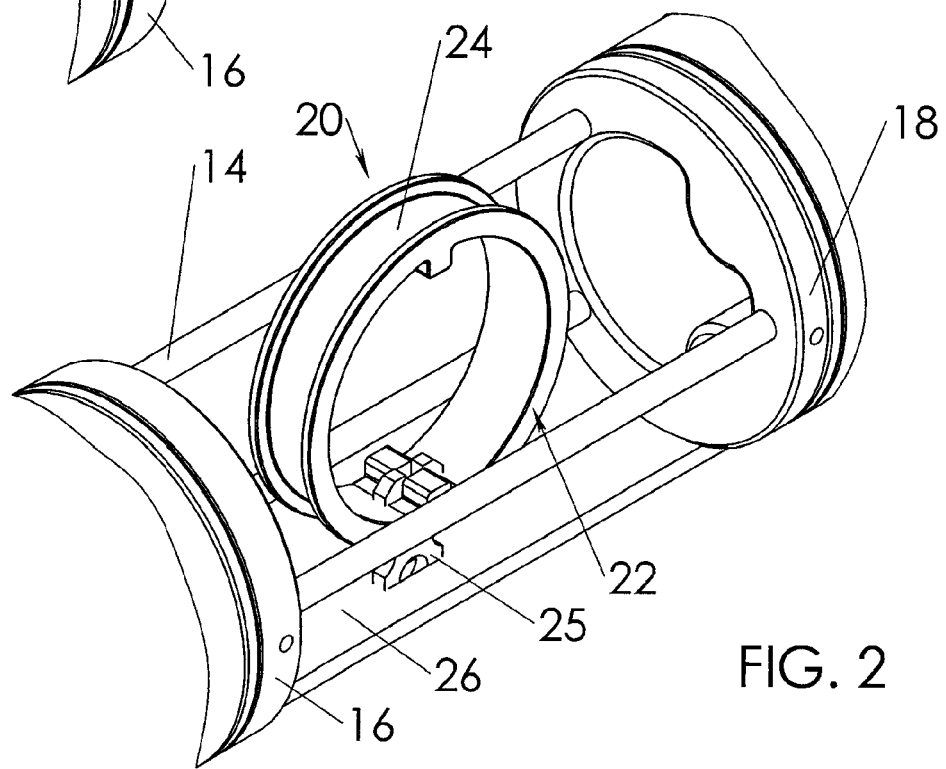
FIG. 2 is a perspective view of a fiber management apparatus according to a first embodiment positioned between two fiber optic devices.

FIGS. 3, 4 and 6 to 9 illustrate one embodiment of a fiber management apparatus 20 for managing an optical fiber, while FIG. 2 illustrates the apparatus 20 mounted between two fiber optic devices 16, 18. It can be seen by comparison of FIGS. 1 and 2 that the amount of space needed to manage the fibers is substantially halved when the apparatus 20 of FIG. 2 is used instead of the prior art apparatus 10 of FIG. 1 which has two separate spools. The apparatus 20 includes a winding device comprising single spool 22 having a race or track 24 onto which fiber can be wound and a guide member 25 projecting radially outwardly from a central region of the track. The apparatus 20 further comprises a base or mounting device 26 on which the winding device is mounted. The guide member acts as an aid for spooling fiber on the track, as described in more detail below, and in the illustrated embodiment also acts as a mounting attachment to the base. However, in alternative embodiments, the guide member 25 may act only as a guide and not as a mounting attachment, and may be eliminated altogether in other embodiments. As illustrated in FIG. 2, the base 26 may be secured between two fiber optic devices 16, 18, such as a connector shell and a cable termination housing, so that the spool 22 is positioned between the end faces of the devices and can be used to take up any slack in spliced fibers extending between the devices.

Figures 3, 4:
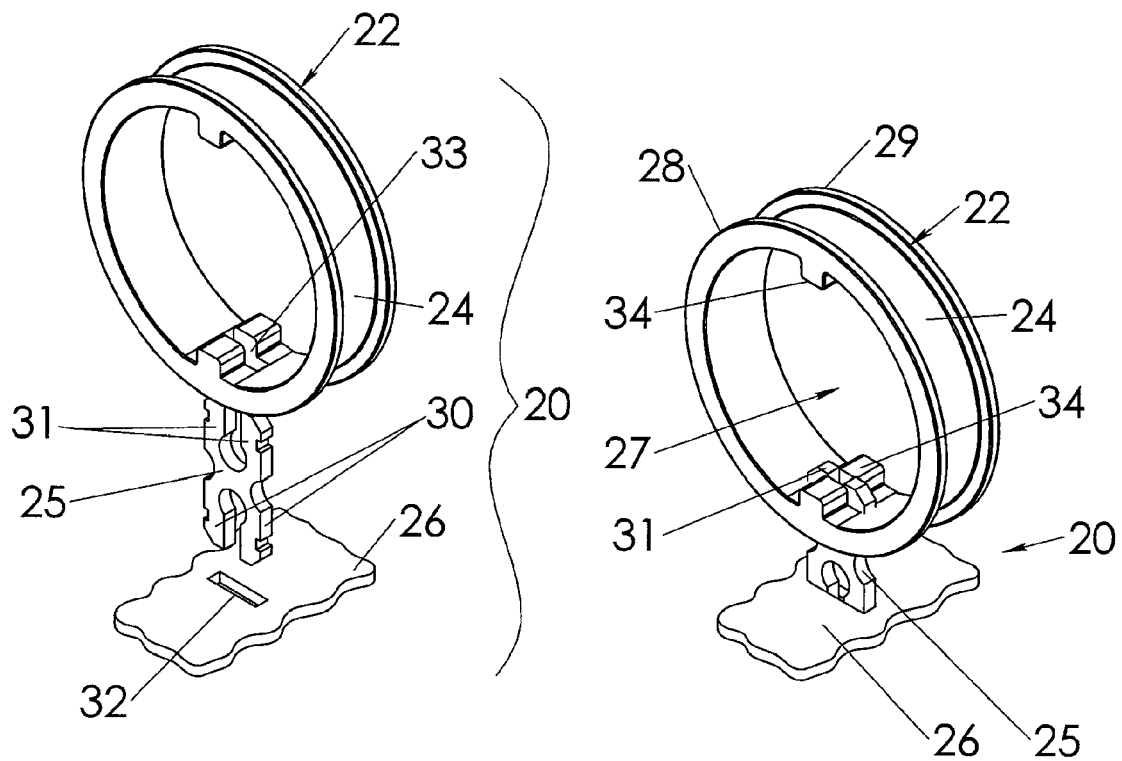
FIG. 3 is a perspective view of the fiber management apparatus of FIG. 2 prior to installation, with part of the base broken away.
FIG. 4 is a perspective exploded view similar to FIG. 3 but illustrating the parts of the apparatus separated from one another.

In the embodiment of FIGS. 3 and 4, the base 26 is shown with broken away edges since the outer peripheral shape and dimensions of the base are dependent on the actual installation, and may be varied in different embodiments. Base 26 may be a base plate or platform of rectangular, round, or other shapes. In this embodiment, the guide member 25 comprises a stand-off clip which has opposite end portions designed for releasable engagement with the spool 22 and base 26 respectively, as explained in more detail below. When the stand-off clip is engaged with the base 26 and spool 22, as in FIG. 3, the spool is raised above the base 26 to allow winding of an elongate element about the spool, as described in more detail below in connection with FIGS. 6 to 8.

In alternative embodiments, the stand-off clip may be secured to the spool at one end or may be integrally formed with the spool, as described in more detail below in connection with FIGS. 10 and 11. Also, instead of a single guide member, diametrically opposed, outwardly projecting guide members may be provided on opposite regions of the track, and in this case the guide members are located at ninety degrees to the stand-off clip location of FIGS. 3 and 4. In other embodiments, the guide member may be eliminated altogether.

In one embodiment, the spool is hollow and comprises an outer ring with a central opening 27. The winding race or track 24 has raised rims 28, 29 extending around the opposite sides of the race or track 24 to assist in holding fiber on the track. The race or track is of predetermined width based on the width of the fiber, and has a width greater than or substantially equal to at least two times the width of the fiber plus the width of the guide member or stand-off clip 25, if present. The stand-off clip is of sufficient structural strength to support the spool. In embodiments in which the spool is used for winding individual fibers, the track width can be much less than that of a spool for holding ribbon fiber.

As seen in FIGS. 3 and 4, mounting clip 25 has resilient fingers 30, 31 at its opposite ends for snap engagement in mating slots 32, 33 in the base and spool, respectively. A pair of diametrically opposed projections or guide ribs 34 project inwardly from the inner surface of the spool 22.

Figures 6A, 6B, 6C:
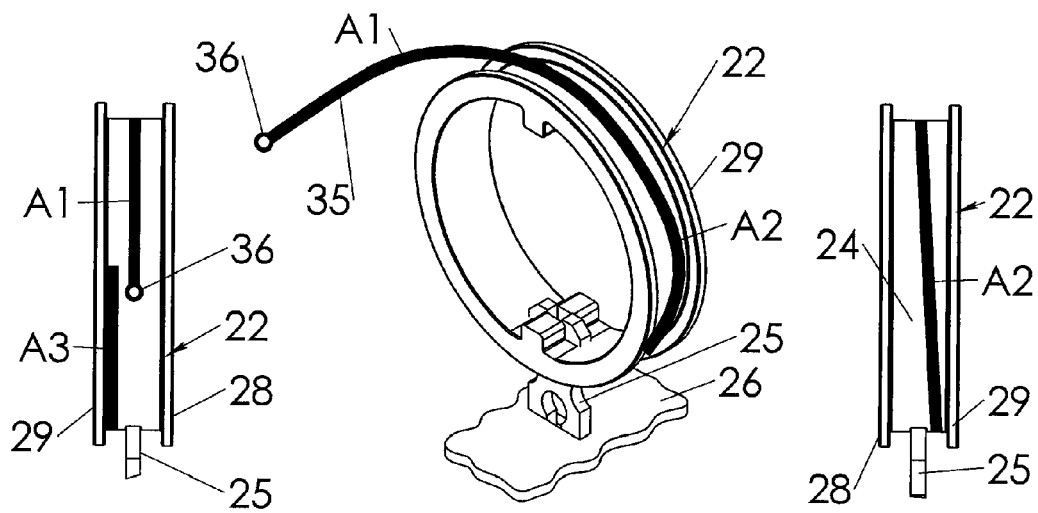
FIG. 6A is a perspective, schematic view illustrating winding of a first turn of a fiber onto the device of FIG. 3.
FIG. 6B is a left side elevation view of the spool at the winding stage of FIG. 6A.
FIG. 6C is a right side elevation view of the spool at the winding stage of FIG. 6A.
Figures 7A, 7B, 7C:
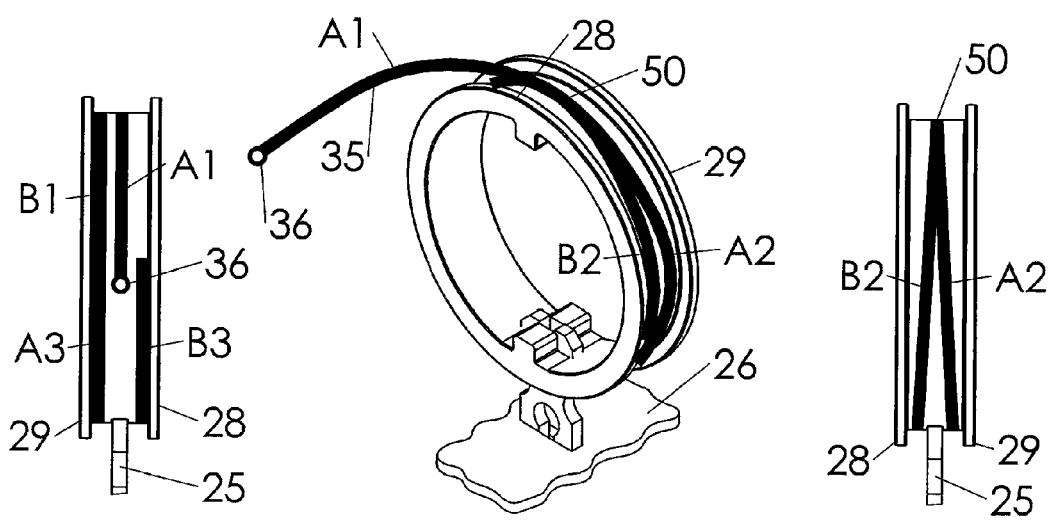
FIG. 7A is a perspective view similar to FIG. 6A illustrating winding of a second turn of a fiber onto the spool.
FIG. 7B is a left side elevation view of the spool at the winding stage of FIG. 7A.
FIG. 7C is a right side elevation view of the spool at the winding stage of FIG. 7A.
Figures 8A, 8B, 8C:
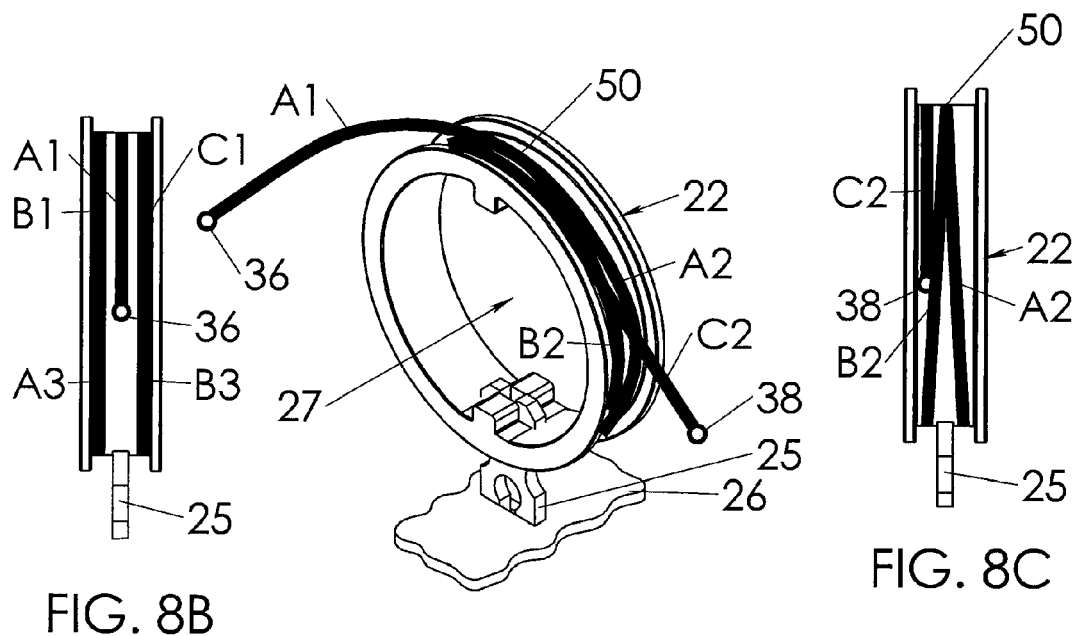
FIG. 8A is a perspective, schematic view similar to FIGS. 6A and 7A illustrating a fully managed condition.
FIG. 8B is a left side elevation view of the spool at the winding stage of FIG. 8A.
FIG. 8C is a right side elevation view of the spool at the winding stage of FIG. 8A.
Figure 9:
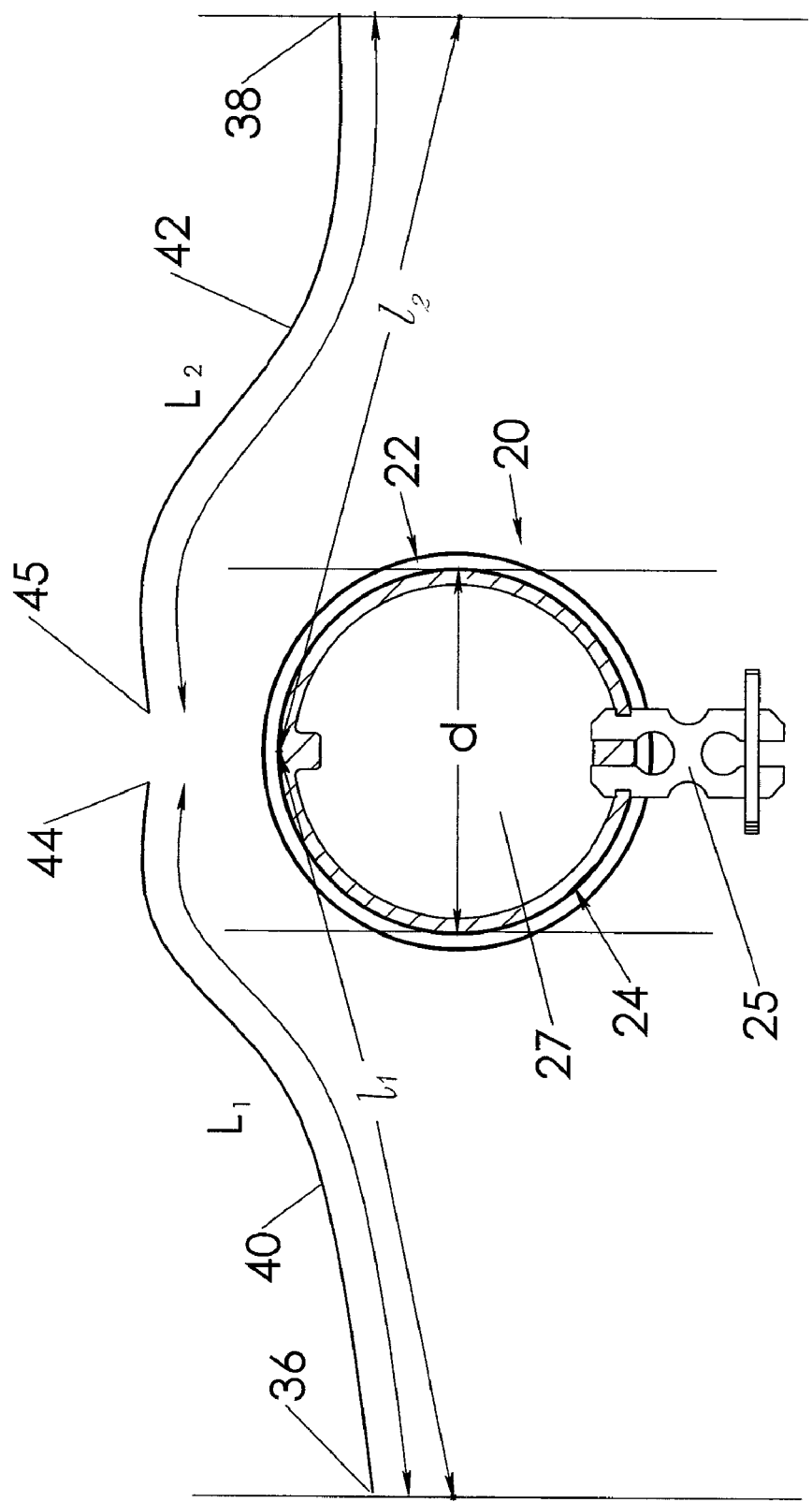
FIG. 9 is a schematic front elevation view of the fiber management apparatus of FIGS. 2 to 8 positioned between two fixed fiber points at two fiber optic devices, illustrating parameters for calculating a desired total spliced fiber length prior to splicing and winding of the fiber.

One embodiment of a method of winding a fiber such as a ribbon fiber 35 which has fixed or inaccessible ends onto the spool 22 in the apparatus 20 is illustrated schematically in FIGS. 6 to 9. FIG. 9 illustrates an initial stage in the fiber management process where the apparatus 20 is positioned between two fixed fiber points 36, 38 at the exit faces of two fiber optic devices to be connected together. Prior to connection, fiber pigtails 40, 42 of variable length project from each optical device housing. These fiber pigtails can be adjusted in length prior to splicing, as described in more detail below. After splicing, the excess fiber is wound onto spool 22 as illustrated in FIGS. 6 to 8. A first turn of fiber 35 is wound around one side region of the track 24 adjacent one side rim 29 and on one side of the guide member or stand-off clip 25, as shown in FIG. 6A. This turn is wound following the sequence A1, A2, A3, as illustrated in FIGS. 6A, 6B, and 6C. Prior to making the first turn, the fiber enters the spool approximately at the center of track 24 as seen in FIG. 6A, before passing to one side of stand-off clip 25 at the lower end of the spool, as illustrated in FIG. 6C. After passing one side of the stand-off clip 25, the fiber is crossed over at cross-over point 50 to the second side region of the spool (on the opposite side of stand-off clip 25) adjacent rim 28, as illustrated in FIGS. 7A, 7B and 7C. A second turn is then wound around the second side region of the spool track in the sequence B1, B2, B3, until it passes the opposite side of stand-off clip 25. The fiber is then crossed over back to the first side region in the vicinity of point 50, and continues through turn C1, C2 as indicated in FIGS. 8A, 8B, and 8C.

Additional windings around the first and second side regions of the spool can be made in the same way as illustrated in FIGS. 6 to 8, with the winding continued in this pattern as necessary until at least the majority of the slack in the fiber is taken up. This winding method effectively winds the fiber in a folded figure eight pattern, and cancels twist on the fiber which would result if successive turns were simply wound one on top of the other without any cross over or alternating between opposite sides of the spool. With this winding method, as long as there is an even number of turns, there is substantially no twist on the fiber. If there is an odd number of turns, there is about one half turn of twist in the final winding. One or more tie wraps, clips, or other holding devices may be engaged with the spool in this condition and extend over the winding track to hold the wound fiber in place. The side rims 28, 29 may be provided with openings for engaging such holding devices.

The stand-off clip or guide member 25 at the center of the track or race 24 aids in making the alternate route windings around opposite side regions of the track 24. However, a guide member 25 is not essential and may be eliminated in alternative embodiments, with the user simply guiding the fiber in alternate windings around opposite side regions of the track in an equivalent manner, without using a central guide member.

Although a length of an individual fiber or ribbon fiber is described above, multiple individual fibers may be wound on the same spool in the same manner as described above. Multiple ribbon fibers may also be wound on a single spool, depending on the depth of the winding track or race or the height of rims 28, 29. In this case, successive ribbon fibers are managed or wound one over the other, as long as the dimensions of the spool are appropriate to accommodate them.

Figure 5:
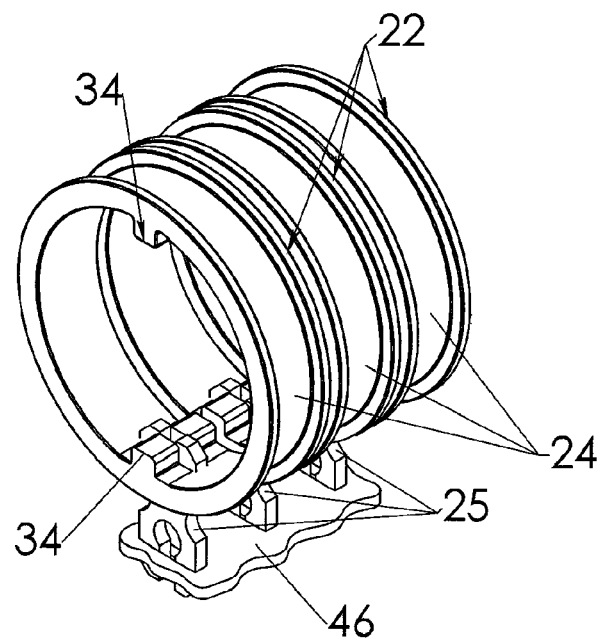
FIG. 5 is a perspective view similar to FIG. 3 illustrating several spools positioned on the mounting device.

FIG. 5 illustrates a plurality of winding devices mounted on a modified base 46 with the spool openings 27 aligned. Base 46 has additional clip mounting slots 32 for receiving the end of each stand-off clip 25 to support each spool 22 at a spaced location above the base. Apart from the ability to mount multiple spools 22 on the base 46, so that a greater number of ribbon fibers or multiple individual fibers can be wound than could be managed on a single spool, the apparatus is otherwise identical to the single spool version of FIGS. 2 to 4, and like reference numbers have been used for like parts as appropriate.

In order to wind a length of a flexible elongate element or fiber having fixed or inaccessible ends onto a spool in the manner described above, there must be access or space on both sides of the spool to allow an installer to manipulate the fiber in the desired path. Depending on the specific application, sufficient space may be available on both sides when the spool is in its final mounting position. If not, windings are made with the spool spaced from its final position between the fiber optic devices, until all but about one turn of fiber is wound. The spool is then placed in its final position with the cross over region on the spool accessible, and the final turn is made.

Although no fibers are shown wound on the spools 22 in FIG. 5, in practice fiber may be wound on each spool before the associated mounting clip 25 is engaged with base 46, to allow more space for winding purposes, unlike the single spool version of FIGS. 3 and 4 where fiber may be wound after the spool mounting clip is engaged with the base 26. The winding may be done sequentially, with a length of a first fiber wound on a first spool and the attached mounting clip then engaged with base 46, followed by winding a length of a second fiber on a second spool and then attaching the associated mounting clip to the base, and so on until fiber has been wound on all the spools. In an alternative embodiment, the slots 32 in base 46 may be spaced farther apart so that there are spaces between adjacent spools when mounted on the base. This may allow winding of fiber onto each spool after it is mounted on the base. Although three spools are shown mounted on the base 46 in FIG. 5, the base may be adapted to receive a greater number of spools in alternative embodiments.

As illustrated in FIG. 2, the fiber or flexible elongate element managing apparatus 20 takes up only about half of the space of a prior art fiber managing apparatus 10 as illustrated in FIG. 1, since it has only one spool instead of two side-by-side spools. At the same time, it still allows fiber to be wound in a folded figure eight pattern while introducing little or no torque in the fiber. The space saving can be helpful when such devices have to be installed in an area having only a restricted amount of space. The stand-off clip of FIGS. 2 to 5 acts as both a guide for winding fiber alternately about opposite sides of the spool winding track or race, and as a stand-off for mounting the spool at a location spaced above a mounting base.

A method of adjusting the length of fiber to be managed so that it is close to a whole number of turns on the spool 22 is described below, with reference to FIG. 9. A fiber pigtail of one or more individual fibers or ribbon fiber normally extends from a housing or enclosure for a fiber optic device such as an optical connector shell or a cable termination housing before the device is connected to another such device in an assembly. FIG. 9 illustrates a first fiber pigtail 40 projecting from a fixed fiber end or point 36 at a first fiber optic device, and a second fiber pigtail 42 projecting from a fixed fiber end or point 38 at a second fiber optic device. The pigtails have free ends 44, 45 prior to splicing.

In FIG. 9, the length $L_1$ is the pigtail length from the fixed point or end of one of the fibers or ribbon fibers at a first device, the length $L_2$ is the pigtail length from the fixed point or end of the other fiber or ribbon fiber at a second device, d is the diameter of the winding track 24 of spool 22 of the fiber management apparatus 20, and $l_1$ and $l_2$ are the distances on each side of the spool 22 from the fibers' fixed points to the points where the spliced fiber joins the winding track 24, typically at the apex or uppermost region of the spool. Prior to splicing, a total spliced fiber length L is calculated as follows: $L=L_1+L_2=l_1+l_2+n\pi d+\epsilon$, where $\epsilon <<< d$ is a small additional length to compensate for fiber buildup on the winding track with successive fiber windings, and n is an integer corresponding to a number of turns of fiber on spool 22. Using this relationship, the installer can calculate total spliced fiber lengths L corresponding to substantially a whole number of turns on the spool 22, so that only a small amount of excess fiber is left after winding in the figure eight pattern as described above. The integer n may be an even or odd number. Where n is an odd number, there is one half turn of twist left after winding on the spools. After calculating the length L, the pigtails can then be cut to appropriate lengths. The length $L_1$ and the length $L_2$ may be different as long as the total of these lengths meets the above relationship, and the installer can appropriately adjust these lengths based on the available pigtail lengths on each side.

In the event of fiber damage after a splice, a section of length $q\pi d$, where q is an integer, which spans the damaged portion may be removed or cut out before re-splicing. If possible, depending on the length of the damaged portion, q is equal to one so as to minimize the discarded fiber. This means that the fiber length after splicing is still approximately equal to a whole number of turns on the spool 22.

In order to assist in winding and reducing twist in the fiber, ribbon fiber may have a predetermined color or insignia on one face which is then arranged to be outermost for each turn on opposite sides of the spool. This helps the operator to avoid unintended twist while winding the ribbon fiber.

Figure 10:
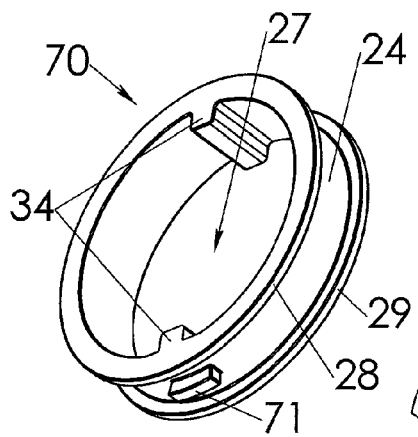
FIG. 10 is a perspective view of a modified spool.
Figure 11:
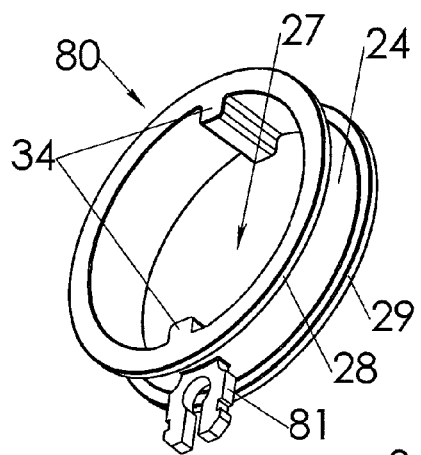
FIG. 11 is a perspective view of another modified spool.

FIGS. 10 and 11 illustrate modified winding devices or spools 70 and 80 which may be used in place of spool 22 and stand-off clip 25 of FIGS. 2 to 4 in a modified fiber management apparatus. The spool 70 of FIG. 10 has an integrally formed guide member or protrusion 71 in the center of the winding track 24, in place of the removable stand-off clip 25 of the previous embodiment. Spool 70 is otherwise identical to that of FIGS. 2 to 4, and like reference numerals have been used for like parts as appropriate.

The spool 80 of FIG. 11 is similar to spool 22 but instead of a removable, double-ended clip 25 as provided with spool 22, the clip 81 is integrally formed with the spool at the center of winding track 24 at one end and has resilient fingers 30 at its opposite end which may be used for engagement in a slot in a suitable base member 26, as in the first embodiment. Alternatively, the clip 81 may be formed separately from the spool and permanently secured to the center of the winding track. The spool 80 is otherwise identical to spool 22, and like reference numerals have been used for like parts as appropriate.

Figure 12:
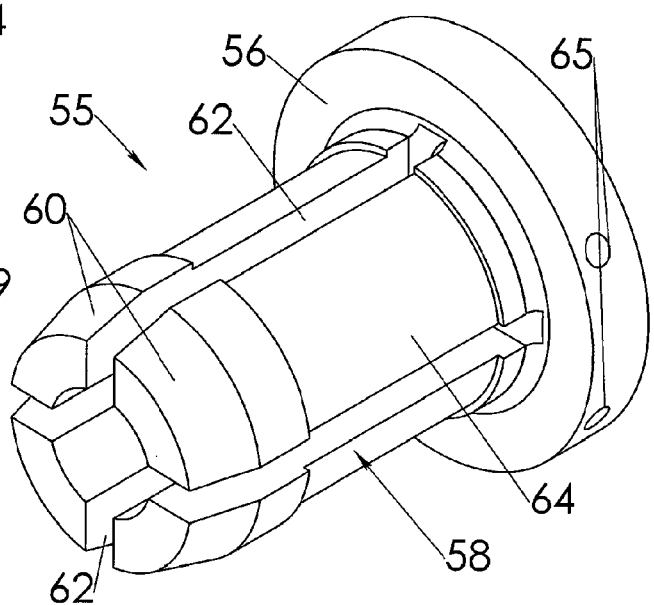
FIG. 12 is a perspective view of an alternative mounting device.

FIG. 12 illustrates another embodiment of a mounting device 55 for holding one or more of the spools 22, 70 or 80 described above. The mounting device 55 is similar or identical to the folding spool mounting device described in co-pending application Ser. No. 11/757,023 filed on Jun. 1, 2007, the contents of which are incorporated herein by reference. The mounting device of FIG. 12 comprises a base 56 having a projecting hub 58 for extending through the central opening 27 in a spool. The hub 58 comprises a four-finger collet having four flexible fingers 60 arranged to grip against the central opening in the spool, with gaps or keyways 62 between each adjacent pair of fingers. A greater or lesser number of fingers may be provided in alternative embodiments. A mounting recess 64 is provided on the outer surface of each finger 60.

Figure 13:
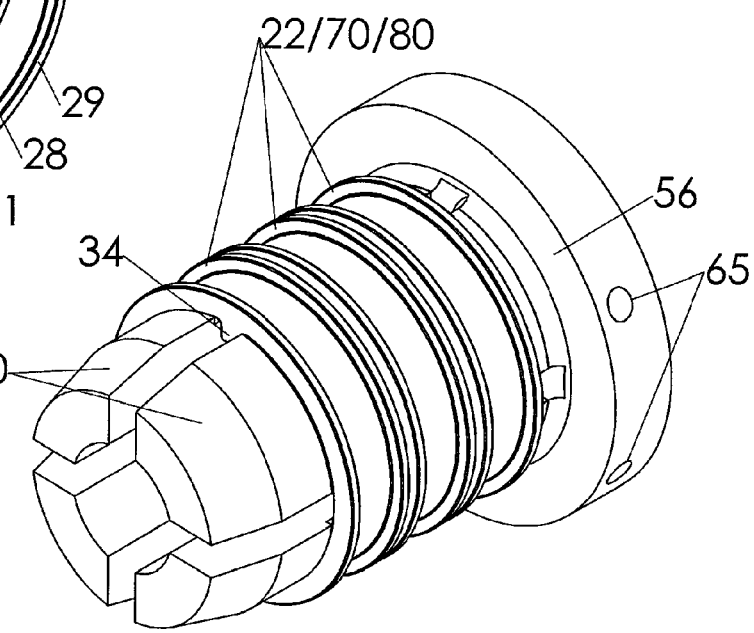
FIG. 13 is a perspective view illustrating the spools of any of the preceding embodiments mounted on the mounting device of FIG. 12.

FIG. 13 illustrates a plurality of spools 22, 70 or 80 mounted on hub 58. A spool 22, 70, or 80 is first positioned with opening 27 aligned with hub 58 and projections or guide ribs 34 aligned with keyways 62, and the central opening 27 is then moved over the hub. The projections or guide ribs 34 engage in the keyways 62 between adjacent fingers of the hub 58 to restrict rotation of the spool device 20. The fingers 60 are urged inwardly as the device 20 is forced over the outer regions of the fingers, and then spring outwardly to grip against the spool opening when the spool is aligned and seated on the mounting recess 64. One or more spools may be mounted on the hub 58 where multiple ribbon fibers or bunches of fibers are to be managed. FIG. 13 illustrates a stack of three spools 22, 70 or 80 mounted on the mounting device 55. A greater or lesser number of spools may be accommodated with suitable adjustment of the length of hub 58.

The base 56 of the mounting device 58 may have a mounting arrangement for engagement with stand-off rods between two fiber optic devices. In the illustrated embodiment, the base 56 has one or more through bores 65 for engagement over stand off rods. Other types of stand-off rod engagement mechanisms may be used in alternative embodiments, such as grooves in the rear face of base 56, or an attachment clip or the like.

The fiber winding method using the spools 70 or 80 of FIGS. 10 and 11 is the same as illustrated in FIGS. 6 to 8 for the first embodiment and as described above. The guide member or projection 71 in FIG. 10 and the clip 81 of FIG. 11 act in the same way as stand-off clip 25 of the first embodiment in guiding fiber for winding successive turns of fiber alternately on opposite side regions of winding track 24. Both spool 22 and spool 80 may be selectively mounted either on a flat plate or base 26 as in FIGS. 2 to 5, or on the hub of mounting device 55, while spool 70 may be selectively mounted on mounting device 55.

In each of the above embodiments, a spool has a projection or guide member located at the center of a winding track to act as a guide for directing alternate windings of a fiber on opposite side regions of the winding track on opposite sides of the guide member. In some embodiments, the guide member is a stand-off clip which has the additional function of mounting the spool on a base at a spacing from the base sufficient to allow winding. Fiber enters the winding track approximately at the center of the track, and may enter at a position substantially opposite to the guide member or stand-off clip. It is then directed around one side region of the track on one side of the guide member, and after one turn the fiber crosses over to the opposite side region of the track on the other side of the guide member. This procedure can be repeated for successive turns until at least a majority of the slack is taken up. Although a guide member is used in each of these embodiments, and is an aid for spooling the fiber as shown in FIGS. 6 to 8, it may be eliminated in alternative embodiments. The user can still spool alternate windings around opposite side regions of the track to form a folded figure eight pattern, even if no guide member is present Although the above embodiments describe use of the apparatus for managing individual optical fibers or ribbon fiber containing multiple fibers, it may alternatively be used for managing excess lengths of any type of flexible, elongate element with appropriate adjustment of the spool diameter and track width. In alternative embodiments, apparatus 20 may be used for managing other types of flexible elongate elements such as electrical wires or cables, steel wires and ropes as used in the construction and elevator industry, hoses such as hydraulic or pneumatic fluid carrying hoses, threads of wool, nylon, and the like as used in the textile industry, and others. The dimensions and material of spool 22, 70, or 80 may be suitably adjusted based on the thickness and the likely length of the flexible elongate element to be managed. In the case of optical fiber, fibers, or ribbon fibers, the winding groove of each spool member has a radius which is equal to or greater than the fiber minimum bend radius.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An apparatus for managing a length of optical fiber between two fixed points, comprising:

a spool having an outwardly directed winding track;

a length of optical fiber wound on the spool, the fiber extending between two fixed points on the fiber which are spaced outwardly from the wound length of fiber and the spool winding track and not secured to the spool;

the winding track having opposite first and second side edges, a first side region extending around the circumference of the track adjacent the first side edge, a second side region extending around the circumference of the track adjacent the second side edge, and a central region between the first and second side regions, the track having a radius greater than the minimum bend radius of the optical fiber to be managed; and the first side region and second side region receiving alternating, successive windings of the length of optical fiber, each winding extending in a circumferential direction about the respective side region, with the optical fiber crossing over from one side region to the other side region between successive windings at a cross over area in the central region of the track, whereby a folded figure eight pattern is formed.

2. The apparatus of claim 1, further comprising at least one guide member associated with the spool and projecting radially outwards from the central region of the track.

3. The apparatus of claim 2, wherein the winding track is of predetermined width at least equal to the width of the guide member plus at least two times the width of a length of optical fiber to be wound on the track.

4. The apparatus of claim 1, wherein the track has opposite side edges and the spool has a pair of annular rims projecting from opposite side edges of the track.

5. The apparatus of claim 1, wherein the spool has a central opening extending axially through the spool.

6. The apparatus of claim 1, wherein the optical fiber is a ribbon fiber.

7. An apparatus for managing a length of a flexible elongate element between two fixed points, comprising:

a spool having an outwardly directed winding track;

the winding track having opposite first and second side edges, a first side region extending around one side of the track adjacent the first side edge, a second side region extending around the opposite side of the track adjacent the second side edge, and a central region between the first and second side regions;

the first side region and second side regions receiving alternating, successive windings of a flexible elongate element with the flexible elongate element crossing over from one side region to the other side region between successive windings at a cross over area in the central region of the track, whereby a folded figure eight pattern is formed;

at least one guide member projecting radially outwards from the central region of the track; and a mounting device, the guide member comprising a stand-off clip having a first end secured to the track and a second end secured to the mounting device.

8. The apparatus of claim 7 wherein the stand-off clip is releasably secured to the track.

9. The apparatus of claim 7, wherein the stand-off clip is releasably secured to the mounting device.

10. An apparatus for managing a length of optical fiber between two fixed points, comprising:

a spool having an outwardly directed winding track;

the winding track having opposite first and second side edges, a first side region extending around one side of the track adjacent the first side edge, a second side region extending around the opposite side of the track adjacent the second side edge, and a central region between the first and second side regions, the track having a radius greater than the minimum bend radius of the optical fiber to be managed;

the first side region and second side region receiving alternating, successive windings of a length of optical fiber with the optical fiber crossing over from one side region to the other side region between successive windings at a cross over area in the central region of the track, whereby a folded figure eight pattern is formed;

at least one guide member projecting radially outwards from the central region of the track; and the guide member is integrally formed with the track.

11. The apparatus of claim 1, further comprising a mounting device holding the spool.

12. The apparatus of claim 11, further comprising a plurality of spools mounted on the mounting device, and a plurality of lengths of optical fiber, each length wound on a respective spool.

13. The apparatus of claim 11, wherein the mounting device comprises a mounting base and a hub extending from one face of the base, the spool having a central opening which engages over the hub.

14. An apparatus for managing a length of a flexible elongate element between two fixed points, comprising:

a spool having an outwardly directed winding track;

the winding track having opposite first and second side edges, a first side region extending around one side of the track adjacent the first side edge, a second side region extending around the opposite side of the track adjacent the second side edge, and a central region between the first and second side regions;

the first side region and second side regions receiving alternating, successive windings of a flexible elongate element with the flexible elongate element crossing over from one side region to the other side region between successive windings at a cross over area in the central region of the track, whereby a folded figure eight pattern is formed;

a mounting device for holding the spool, the mounting device comprising a mounting base and a hub extending from one face of the base, the spool having a central opening which engages over the hub; and the spool having an inner annular face and a pair of diametrically opposed guide ribs project inwardly from the inner face of the spool, and the hub having a pair of diametrically opposed guide recesses for receiving the guide ribs when the spool is engaged over the hub.

15. The apparatus of claim 14, wherein the hub is of predetermined length for releasably receiving a plurality of spools in a stacked relationship over the hub.

16. An apparatus for managing a length of a flexible elongate element between two fixed points, comprising:

a spool having an outwardly directed winding track and opposite first and second side edges;

a first winding region extending circumferentially around the spool on one side of the track adjacent the first side edge;

a second winding region extending circumferentially around the spool on the opposite side of the track adjacent the second side edge; and alternating, successive turns of a flexible elongate element extending between two fixed points which are spaced from and not secured to the spool wound alternately in a circumferential direction about the first and second winding regions with the flexible elongate element crossing over from one winding region to the other winding region between successive turns in a cross over area so that a folded figure eight pattern is formed; and a mounting device secured to the spool between the first and second side regions which holds the spool in a fixed, non-rotatable position during winding of the flexible elongate element.

17. A method of managing a length of optical fiber between two fixed points of the length of optical fiber, comprising:

positioning a winding spool between two fixed points on a length of optical fiber which are separate from the spool and located at respective first and second positions which are spaced away from the spool in opposite directions, the spool having a central axis and a winding track, the winding track having a circumference;

winding a first turn of the length of optical fiber extending between the two fixed points in a circumferential direction around at least a major portion of the circumference of a first side region of the track while passing the fiber over one axial end of the spool;

crossing the optical fiber over to an opposite, second side region of the track in a cross over area in a central region of the track, whereby a first cross over portion of the length of optical fiber in the cross over area extends at an angle to the direction of the first turn;

winding a second turn of the length of optical fiber in a circumferential direction around at least a major portion of the circumference of the second side region of the track parallel to the winding direction of the first turn while passing the fiber over an opposite axial end of the spool;

crossing the optical fiber back over to the first side region of the track at the cross over area, whereby a second cross over portion of the length of optical fiber in the cross over area extends towards the first side region at an angle to the direction of the second turn; and repeating the preceding four steps until at least the majority of the slack in the length of the optical fiber between the fixed points is taken up and the spool and wound length of fiber are located between the two fixed points on the fiber which are both spaced from the spool.

18. A method of managing a length of optical fiber between two fixed points of the fiber, comprising:

positioning a winding spool having a central axis and a winding track between two fixed points on a length of optical fiber;

winding a first turn of the length of optical fiber extending between the two fixed points around a first side region of the track;

crossing the fiber over to an opposite, second side region of the track in a cross over area in a central region of the track;

winding a second turn of the fiber around the second side region of the track;

crossing the fiber back over to the first side region of the track at the cross over area;

repeating the preceding four steps until at least the majority of the slack in the length of the optical fiber between the fixed points is taken up;

the steps of crossing the optical fiber over from one side region of the track to the other side region of the track comprise crossing first from the first side region located to one side of a guide member projecting radially outwardly from a central region of the track to the second side region of the track located on the opposite side of the guide member, and subsequently crossing from the second side region of the track back to the first side region of the track, the guide member acting as a guide for windings on opposite side regions of the track; and removing the guide member from the track after the winding is complete and subsequently mounting the winding spool on a mounting device.

19. A method of managing a length of a flexible, elongate element between two fixed points of the element, comprising:

mounting a winding spool having a winding track in a fixed, non-rotating position between two fixed points on a length of a flexible elongate member which are completely separate from the spool and not secured to the spool;

winding a first turn of the length of elongate member extending between the two fixed points around a first side region of the track while passing the member around a first axial end of the spool;

crossing the member over to an opposite, second side region of the track in a cross over area in a central region of the track;

winding a second turn of the member around the second side region of the track while passing the member around a second axial end of the spool; and crossing the member back over to the first side region of the track at the cross over area;

and repeating the preceding four steps until at least the majority of the slack in the length of the elongate member between the fixed points is taken up.

20. The method of claim 17, wherein the fiber initially enters the track approximately at the central region of the track before the first turn is wound around the first side region of the track.

21. A method of splicing fibers to extend between two fiber containing devices and managing excess length of fiber between the devices after splicing, which comprises:

adjusting a first length $L_1$ of a first fiber pigtail extending from a first fiber optic device and second length $L_2$ of a second fiber pigtail extending from a second fiber optic device so that the total fiber length $L=L_1+L_2$ is substantially equal to $l_1+l_2+n\pi d$, where d is the diameter of each winding groove, n is an integer, and $l_1$ and $l_2$ are the distances from the respective fiber optic devices to the point where fiber joins a winding track on a winding spool located between the fiber optic devices;

splicing the ends of the adjusted length first and second fiber pigtails together; and winding the length of spliced fiber around the spool in a folded figure eight pattern until at least the majority of the slack in the spliced fiber between the fiber optic devices is taken up.

22. The method of claim 21, wherein the step of winding the length of spliced fiber comprises winding the fiber in a first turn about a first side region of the spool track, crossing the fiber over to a second side region of the track, winding a second turn about the second side region of the track, crossing the fiber back to the first side region of the track, and repeating the preceding four steps until at least the majority of the slack in the spliced fiber is taken up.

23. The method of claim 21, wherein the pigtail lengths are adjusted such that the total spliced fiber length $L=l_1+l_2+n.\pi.d+c$, where $\epsilon$ is a compensation factor based on variation in winding diameter as a result of plural turns of the fiber being wound on top of one another.

24. The method of claim 23, further comprising reworking the spliced fiber length in the event of fiber damage, the reworking step comprising removing a length of fiber spanning the damaged portion, the removed length being substantially equal to $q\pi d$, where q is an integer, and re-splicing the fiber.

25. The method of claim 21, wherein n is an even number, whereby substantially no twist is introduced in the fiber during winding.

26. The apparatus of claim 6, wherein the ribbon fiber is a spliced optical ribbon fiber.

27. The apparatus of claim 16, wherein the elongate element is a spliced optical ribbon fiber.

28. The method of claim 17, wherein the optical fiber is a spliced optical ribbon fiber.

29. The method of claim 21, wherein the optical fiber is optical ribbon fiber.

30. A method of managing a length of a flexible, elongate member between two fixed points of the flexible elongate member, comprising:

positioning a winding spool having a central axis and a winding track between two fixed points on a length of a flexible elongate member, the spool having opposite first and second axial ends which are both free and unobstructed and the fixed points on the elongate member being spaced from the spool and not connected to the spool;

winding a first turn of the flexible elongate member extending between the two fixed points around a first side region of the track in a circumferential direction around the track while passing the elongate member over the first axial end of the track;

crossing the flexible elongate member over to an opposite, second side region of the track in a cross over area in a central region of the track;

winding a second turn of the flexible elongate member around the second side region of the track in a circumferential direction around the track while passing the elongate member over the second axial end of the track;

crossing the flexible elongate member back over to the first side region of the track at the cross over area; and repeating the preceding four steps until at least the majority of the slack in the length of the elongate member between the fixed points is taken up and the spool and windings of the elongate member are located between the two fixed points on the elongate member which are both spaced away from the spool and windings.

31. The method of claim 30, wherein the elongate member is optical fiber.

32. An apparatus for managing a length of a ribbon member between two fixed points on the ribbon member, comprising:

a spool having an outwardly directed winding track and opposite axial ends;

a length of ribbon member extending between two fixed points on the ribbon member which are not connected to the spool;

the winding track having a width greater than twice the width of the ribbon member;

the winding track having opposite first and second side edges, a first winding region extending around the spool on one side of the track adjacent the first side edge, a second winding region extending around the spool on the opposite side of the track adjacent the second side edge, and a central region between the first and second winding regions;

successive turns of the length of ribbon member extending between the two fixed points being wound alternately in a circumferential direction about the first and second winding regions with the ribbon member crossing over from one winding region to the other winding region between successive turns in the central region so that a folded figure eight pattern is formed and the spool and wound length of ribbon member are located between the two fixed points on the ribbon member which are spaced from the spool and wound length of ribbon member; and the first face of the ribbon member facing outwardly from the spool in each turn of the length of ribbon member wound on the spool.

* * * * *